United States Patent
Breton et al.

(10) Patent No.: US 9,371,464 B2
(45) Date of Patent: Jun. 21, 2016

(54) AQUEOUS INK COMPOSITION

(71) Applicant: Xerox Corporation, Norwalk, CT (US)

(72) Inventors: Marcel P. Breton, Mississauga (CA); Valerie M. Farrugia, Oakville (CA); James D. Mayo, Mississauga (CA); Biby Esther Abraham, Mississauga (CA); Gabriel Iftime, Cupertino, CA (US); Adela Goredema, Mississauga (CA); Jenny Eliyahu, Maple (CA)

(73) Assignee: Xerox Corporation, Norwalk, CT (US)

( * ) Notice: Subject to any disclaimer, the term of this patent is extended or adjusted under 35 U.S.C. 154(b) by 74 days.

(21) Appl. No.: 14/304,904

(22) Filed: Jun. 14, 2014

(65) Prior Publication Data

US 2015/0361285 A1  Dec. 17, 2015

(51) Int. Cl.
| | |
|---|---|
| *C09D 11/30* | (2014.01) |
| *C09D 11/38* | (2014.01) |
| *C09D 11/36* | (2014.01) |
| *C08K 5/41* | (2006.01) |
| *C08K 5/17* | (2006.01) |
| *C08K 5/053* | (2006.01) |

(52) U.S. Cl.
CPC ............... *C09D 11/38* (2013.01); *C08K 5/053* (2013.01); *C08K 5/175* (2013.01); *C08K 5/41* (2013.01); *C09D 11/36* (2013.01)

(58) Field of Classification Search
CPC ...... C09D 11/38; C09D 11/36; C09D 125/14; C09D 11/30; C09D 11/322; C09D 11/326; C09D 11/40; C08K 5/053; C08K 5/175; C08K 5/41
See application file for complete search history.

(56) References Cited

U.S. PATENT DOCUMENTS

| | | | |
|---|---|---|---|
| 2,429,171 A | 10/1947 | Ruzicka et al. | |
| 5,389,958 A | 2/1995 | Bui et al. | |
| 6,063,827 A | 5/2000 | Sacripante et al. | |
| 6,384,266 B1 | 5/2002 | Farone et al. | |
| 6,593,049 B1 | 7/2003 | Veregin et al. | |
| 6,756,176 B2 | 6/2004 | Stegamat et al. | |
| 6,830,860 B2 | 12/2004 | Sacripante et al. | |
| 8,623,126 B1* | 1/2014 | Brust .................. | C09D 11/38 106/31.65 |
| 2002/0187310 A1* | 12/2002 | Kabalnov ............. | B41J 2/2114 428/195.1 |
| 2006/0222991 A1 | 10/2006 | Sacripante et al. | |
| 2014/0024763 A1 | 1/2014 | Jinnou et al. | |

OTHER PUBLICATIONS

Jenny Eliyahu, et al., U.S. Appl. No. 14/066,716, filed Oct. 30, 2013, "Ink Jet Ink for Indirect Printing Applications," not yet published.
English Translation of Abstract of Japanese JP3651063, Application No. 19950185362 19950721, Published Mar. 4, 2005.
Kuczera et al., "Amphiphilic derivatives of betaine esters as modifiers of macrovesicular BLM," Gen. Physiol. Biophys., Jun. 1989; 8(3):223-32.
McNeil, et al., Betaines and Related Osmoprotectants. Targets for Metabolic Engineering of Stress Resistance, Plant Physiology, Aug. 199, vol. 120, pp. 945-949.
Madhusudan Vasudevamurthy, "Betaine Anallogues and Related Compounds for Biomedical Applicatinos," a thesis, 2006, Department of Chemical and Process Engineering, University of Canterbury, Christchurch, New Zealand.
Table 1, Web site Cosmetics & Toiletries® Science Applied, found online at world side web address http://www.cosmeticsandtoiletries.com/ and where the Table is linked at the web address http://www.cosmeticsandtoiletries.com/formulating/function/surfactant/125075444.html, date unknown.
Oxiteno Technical Bulletin, ALKOLAN® CP 30 and ALKOLAN® CAP 30 Technical Bulletin, dated Apr. 2011.

* cited by examiner

*Primary Examiner* — Thinh Nguyen
(74) *Attorney, Agent, or Firm* — Marylou J. Lavoie, Esq. LLC

(57) ABSTRACT

An aqueous ink composition including water; a co-solvent; an encapsulated resinous pigment; a polymer latex; and a low molecular weight humectant solute; wherein the total solids content of the aqueous ink is from about 2 to about 25 percent by weight based on the total weight of the aqueous ink composition.

20 Claims, No Drawings

AQUEOUS INK COMPOSITION

BACKGROUND

Disclosed herein is an aqueous ink composition that is suitable for both direct and indirect printing applications. The aqueous ink composition comprises water; a co-solvent; an encapsulated resinous pigment; a polymer latex; and a low molecular weight humectant solute; wherein the total solids content of the aqueous ink is from about 2 to about 25 percent by weight based on the total weight of the aqueous ink composition.

In direct printing machines, a marking material is applied directly to a final substrate to form the image on that substrate. Other types of printing machines use an indirect or offset printing technique. In indirect printing, the marking material is first applied onto an intermediate transfer member, and is subsequently transferred to a final substrate. A two step printing process can comprise applying an ink in an imagewise fashion onto an intermediate receiving member such as a drum, belt, etc., using an ink jet print head. The ink wets and spreads on the intermediate receiving member to form a transient image. The ink forming the transient image can then undergo a change in properties such as partial or complete drying, thermal or photo-curing, gelating, etc., and the resulting transient image can be transferred to a final image receiving substrate.

U.S. patent application Ser. No. 14/066,716, which is hereby incorporated by reference herein in its entirety, describes a printing process and an aqueous ink for indirect printing applications comprising water; a co-solvent; a colorant; and a polymer latex comprising an aqueous dispersion of polymer particles wherein the polymer latex has a softening temperature of from about 60° C. to less than 105° C. and a glass transition temperature of from about 45° C. to about 100 C. The inks are particularly formulated for printing on an intermediate transfer member where they are fully dried before transfer.

While known ink compositions and processes are suitable for their intended purposes, a need remains for improved ink compositions with certain characteristics. A need remains for inks, specifically for an ink set that has a high solid loading but with significant improvement in stability, jetting performance, and print quality, suitable for both direct to paper with and without paper pre-treatment, and indirect printing where the intermediate substrate is treated and/or coated with a sacrificial release layer.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an aqueous ink composition comprising water; a co-solvent; an encapsulated resinous pigment; a polymer latex; and a low molecular weight humectant solute; wherein the total solids content of the aqueous ink is from about 2 to about 25 percent by weight based on the total weight of the aqueous ink composition.

Also described is a process for preparing an aqueous ink composition comprising 1) preparing a polymer latex; 2) combining the polymer latex with an encapsulated resin pigment, water, a co-solvent, and a low molecular weight humectant solute; wherein the total solids content of the aqueous ink is from about 2 to about 25 percent by weight based on the total weight of the aqueous ink composition to form an aqueous ink composition; and 3) optionally, filtering the aqueous ink composition.

Also described is a process comprising incorporating an aqueous ink comprising water; a co-solvent; an encapsulated resinous pigment; a polymer latex; and a low molecular weight humectant solute; wherein the total solids content of the aqueous ink is from about 2 to about 25 percent by weight based on the total weight of the aqueous ink composition into an ink jet printing apparatus; ejecting droplets of ink in an imagewise pattern onto an intermediate transfer member; optionally, heating the image to partially or completely remove solvents; and transferring the ink in the imagewise pattern from the intermediate transfer member to a final recording substrate; or ejecting droplets of ink in an imagewise pattern directly onto a final image receiving substrate.

DETAILED DESCRIPTION

An aqueous ink composition is provided comprising water; a co-solvent; an encapsulated resinous pigment; a polymer latex; and a low molecular weight humectant solute; wherein the total solids content of the aqueous ink is from about 2 to about 25, or from about 3 to about 20, or from about 5 to about 18 percent by weight based on the total weight of the aqueous ink composition. In specific embodiments, the total solids content is from about 7 to about 15 percent by weight based on the total weight of the aqueous ink composition.

The aqueous ink compositions herein can be prepared so as to provide a high solids content "designer" aqueous ink jet ink set having improved jettability, good transfer properties on a variety of substrate and robustness of final prints. The solid components of the present inks are selected such that they provide a minimum of two enabling functions, thus are provided: 1) An encapsulated resinated pigment for color and stability; 2) A latex for adhesion to substrate, thickness of transfer layer, and robustness; and control of drying properties; and 3) a low molecular weight humectant solute that improves latency by binding water and reducing the vapor pressure of water/co-solvent mixture (Raoult's Law). In specific embodiments, the ratio of the components is selected while keeping total solids content of the ink composition at from about 2 to about 25 percent, or from about 7 to about 15 percent by weight based on the total weight of the aqueous ink composition.

In embodiments, the ink compositions here do not require viscosity modifiers in order to increase to viscosity above 5 cps so as to meet jetting requirements of many piezo inkjet print heads. In order to reduce paper cockle and curl if the inks are to be used for printing on paper directly or are transferred semi-wet, the inks can also contain at least one co-solvent.

Water and Co-Solvent.

In embodiments, the ink compositions contain at least one co-solvent having a solubility parameter in the range of from about 27 to about 37 $MPa^{1/2}$ or from about 27 to about 35 $MPa^{1/2}$. In embodiments, the ink compositions contain a single co-solvent having a solubility parameter in the range of from about 27 to about 37 $MPA^{1/2}$ or from about 27 to about 35 $MPa^{1/2}$ or a mixture of co-solvents wherein the solubility parameter of the mixture is from about 27 to about 37 $MPA^{1/2}$ or from about 27 to about 35 $MPa^{1/2}$. In embodiments, such a co-solvent is 1,5-pentanediol. In certain embodiments, the co-solvent is selected from the group consisting of 1,5-pentanediol, 2-pyrollidone, glycerol, and mixtures thereof. In specific embodiments, the co-solvent is 1,5-pentanediol and a member of the group consisting of 2-pyrollidone, glycerol, and mixtures thereof.

In embodiments, the ink compositions contain at least one co-solvent having a solubility parameter in the range of from about 27 to about 35 $MPa^{1/2}$. In embodiments, the co-solvent is a mixture of 1,5-pentanediol and 2-pyrollidone. In certain embodiments, the co-solvent is 1,5-pentanediol. In other embodiments, the co-solvent is 2-pyrollidone.

In certain embodiments, the co-solvent is selected from the group consisting of 1,5-pentanediol, 2-pyrollidone, glycerol, and mixtures thereof; and the individual co-solvent or mixture of co-solvents has a solubility parameter in the range of from about 27 to about 33 $MPa^{1/2}$.

SI Hildebrand solubility parameters are expressed in mega-pascals. Hildebrand solubility parameter is known to those of skill in the art. The Hildebrand value of a solvent mixture can be determined by averaging the Hildebrand values of the individual solvents by volume as known by those of skill in the art. For example, the target range for measuring solubility parameter is from room temperature to jetting temperature, in embodiments, from about 20 to about 40° C. Solubility parameters can be determined using modeling software such as Molecular Modeling Pro Plus available from Norgwyn Montgomery Software Inc. In embodiments, the solubility parameter for 1,5-pentanediol at 25° C. is 27.6, the solubility parameter for 2-pyrrolidone at 25° C. is 28.4, and the solubility parameter for glycerol at 25° C. is 36.5.

The ink compositions herein can consist solely of water, or can comprise a mixture of water and a water soluble or water miscible organic component, referred to as a co-solvent, humectant, or the like (hereinafter co-solvent) such as alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof. In certain embodiments, the co-solvent is selected from the group consisting of sulfolane, methyl ethyl ketone, isopropanol, 2-pyrrolidinone, polyethylene glycol, and mixtures thereof.

When mixtures of water and water soluble or miscible organic liquids are selected as the liquid vehicle, the water to organic ratio ranges can be any suitable or desired ratio, in embodiments from about 97:3 to about 30:70, or from about 95:5 to about 40:60, or from about 90:10 to about 51:49. The non-water component of the liquid vehicle generally serves as a humectant which has a boiling point higher than that of water (100° C.), or as a co-solvent which has a boiling point as low as 70° C. The organic component of the ink vehicle can also serve to modify ink surface tension, modify ink viscosity, swell the latex and/or disperse the colorant, and/or affect the drying characteristics of the ink.

The total amount of liquid vehicle can be provided in any suitable or desired amount. In embodiments, the liquid vehicle is present in the ink composition in an amount of from about 55 to about 97 percent, or from about 60 to about 90 percent, or from about 65 to about 90 percent, by weight, based on the total weight of the ink composition.

Encapsulated Resinous Pigment.

The ink compositions contain an encapsulated resinous pigment which provides color and stability to the aqueous ink composition. Any suitable or desired encapsulated resinous pigment can be selected. In embodiments, the encapsulated resinous pigment is a material commercially available from Sun Chemical Company under the name MCX-059-SJ where X is C, M, Y, Bk representing respectively the colors cyan, magenta, yellow and black.

The encapsulated resinous pigment comprises a pigment core surrounded by a resin shell. The pigment core can be comprised of any suitable or desired pigment. In embodiments, the pigment comprises a black pigment, a magenta pigment, a cyan pigment, a yellow pigment, or a combination thereof.

The resin shell surrounding the pigment core can comprise any suitable or desired resin. In embodiments, the resin shell can be selected from a member of the group consisting of a non-ionic resin, an anionic resin, and combinations thereof.

The encapsulated resinous pigment can be prepared by any suitable or desired process. In embodiments, the encapsulated resinous pigment can be prepared by the process described in Japanese Patent JP3651063, which describes in the English translation of the Abstract thereof a process for producing a water-based pigment dispersion having a vol. average particle size of 10-500 nm is characterized in that a water containing cake comprising a resin having an acid value due to carboxyl group of 30 to 120 and a pigment is dispersed in a water-based medium by neutralizing a part of or all the carboxyl groups with a basic compound. In embodiments, the resinous pigment can be prepared by the process described in U.S. Patent Publication No. 2014/0024763, which is hereby incorporated by reference herein in its entirety, and which describes in the Abstract thereof a process for producing a pigment-encapsulating polymer dispersion, comprising the steps of dispersing a liquid containing a monomer, a hydrophobe and a polymerization initiator into a water medium with a dispersant to obtain a monomer emulsion, and mixing the monomer emulsion with a pigment dispersion containing a self-dispersible pigment to which a hydrophilic group is bonded directly or through another atomic group and which is dispersed by the hydrophilic group, subjecting the resultant mixture to a shearing treatment and then polymerizing the monomer.

The encapsulated resinous pigment can have any suitable or desired particle size. In certain embodiments, wherein the encapsulated resinous pigment particles exhibit an average particle size of from about 30 to less than about 230 nanometers, or from about 35 to less than about 200 nanometers, or from about 40 to less than about 150 nanometers. In specific embodiments, the encapsulated resinous pigment particles have a Z average particle size of from about 60 to about 250 nanometers, or from about 55 to less than about 120 nanometers. Average particle size can be measured in any suitable or desired way, such as with a Nanotrac™ 252 (Microtrac, Montgomeryville, Pa., USA) particle size analyzer.

The encapsulated resinous pigment can be present in the ink composition in any desired or effective amount, in embodiments, can be present in an amount of from about 0.05 to about 15 percent, or from about 0.1 to about 10 percent, or from about 1 to about 5 percent by weight, based on the total weight of the ink composition. In specific embodiments, the encapsulated resinous pigment is provided in an amount such that the total solids content of the aqueous ink is from about 7 to about 15 percent by weight based on the total weight of the aqueous ink composition.

Colorant.

The ink composition herein may also contain an optional colorant in addition to the encapsulated resinous pigment colorant. Any suitable or desired colorant can be used in embodiments herein for the encapsulated pigment or for the optional additional colorant, including pigments, dyes, dye dispersions, pigments dispersions, and mixtures and combinations thereof. In embodiments, the optional additional colorant is a non-ionic colorant, an anionic colorant, or a combination thereof.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

As noted, any suitable or desired pigment colorant can be selected for the encapsulated resinous pigment or any suitable or desired colorant for the optional additional colorant in embodiments herein. The optional additional colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like, as well as mixtures thereof.

Examples of suitable pigments which can be selected for the encapsulated resinous pigment or for the optional additional colorant include black pigments, white pigments, cyan pigments, magenta pigments, yellow pigments, or the like. Further, pigments can be organic or inorganic particles. Suitable inorganic pigments include carbon black. However, other inorganic pigments may be suitable such as titanium oxide, cobalt blue (CoO—Al$_2$O$_3$), chrome yellow (PbCrO$_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, REGAL®, BLACK PEARLS®, ELF- TEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The encapsulated resinous pigment can be present in the ink composition in any desired or effective amount, in embodiments, the encapsulated resinous pigment can be present in an amount of from about 0.05 to about 15 percent, or from about 0.1 to about 10 percent, or from about 1 to about 5 percent by weight, based on the total weight of the ink composition.

In specific embodiments, the additional colorant, if present, is provided in an amount such that the total solids content of the aqueous ink is from about 2 to about 25 percent, or from about 7 to about 15 percent by weight based on the total weight of the aqueous ink composition.

Polymer Latex.

In embodiments, the latex resin may be composed of a first and a second monomer composition. Any suitable monomer or mixture of monomers may be selected to prepare the first monomer composition and the second monomer composition. The selection of monomer or mixture of monomers for the first monomer composition is independent of that for the second monomer composition and vice versa. Exemplary monomers for the first and/or the second monomer compositions include, but are not limited to, polyesters, styrene, alkyl acrylate, such as, methyl acrylate, ethyl acrylate, butyl acrylate, isobutyl acrylate, dodecyl acrylate, n-octyl acrylate, 2-chloroethyl acrylate; β-carboxy ethyl acrylate (β-CEA), phenyl acrylate, methyl alphachloroacrylate, methyl methacrylate, ethyl methacrylate and butyl methacrylate; butadiene; isoprene; methacrylonitrile; acrylonitrile; vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone and methyl isopropenyl ketone; vinylidene halides, such as, vinylidene chloride and vinylidene chlorofluoride; N-vinyl indole; N-vinyl pyrrolidone; methacrylate; acrylic acid; methacrylic acid; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; isobutylene; and the like, and mixtures thereof. In case a mixture of monomers is used, typically the latex polymer will be a copolymer.

In some embodiments, the first monomer composition and the second monomer composition may independently of each other comprise two or three or more different monomers. The latex polymer therefore can comprise a copolymer. Illustrative examples of such a latex copolymer includes poly(styrene-n-butyl acrylate-β-CEA), poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly (alkyl acrylate-acrylonitrile), poly(styrene-butadiene), poly (methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylonitrile), and the like.

In embodiments, the first monomer composition and the second monomer composition may be substantially water insoluble, such as, hydrophobic, and may be dispersed in an aqueous phase with adequate stiffing when added to a reaction vessel.

The weight ratio between the first monomer composition and the second monomer composition may be in the range of from about 0.1:99.9 to about 50:50, including from about 0.5:99.5 to about 25:75, from about 1:99 to about 10:90.

In embodiments, the first monomer composition and the second monomer composition can be the same. Examples of the first/second monomer composition may be a mixture comprising styrene and alkyl acrylate, such as, a mixture comprising styrene, n-butyl acrylate and β-CEA. Based on total weight of the monomers, styrene may be present in an amount from about 1% to about 99%, from about 50% to about 95%, from about 70% to about 90%, although may be present in greater or lesser amounts; alkyl acrylate, such as, n-butyl acrylate, may be present in an amount from about 1% to about 99%, from about 5% to about 50%, from about 10% to about 30%, although may be present in greater or lesser amounts.

The polymer latex can comprise any suitable or desired polymer material. In embodiments, the polymer latex comprises a latex emulsion comprising polymer particles generated from the emulsion polymerization of styrene, n-butyl acrylate, methacrylic acid, beta-CEA (β-carboxyethyl acrylate), and an optional surfactant.

Initiators.

Any suitable initiator or mixture of initiators may be selected in the latex process and the toner process. In embodiments, the initiator is selected from known free radical polymerization initiators. The free radical initiator can be any free radical polymerization initiator capable of initiating a free radical polymerization process and mixtures thereof, such free radical initiator being capable of providing free radical species on heating to above about 30° C.

Although water soluble free radical initiators are used in emulsion polymerization reactions, other free radical initiators also can be used. Examples of suitable free radical initiators include, but are not limited to, peroxides, such as ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, diisopropyl peroxycarbonate, tetralin hydroperoxide, 1-phenyl-2-methylpropyl-1-hydroperoxide and tert-butylhydroperoxide; pertriphenylacetate, tert-butyl performate; tert-butyl peracetate; tert-butyl perbenzoate; tert-butyl perphenylacetate; tert-butyl permethoxyacetate; tert-butyl per-N-(3-toluyl)carbamate; sodium persulfate; potassium persulfate, azo compounds, such as, 2,2'-azobispropane, 2,2'-dichloro- 2,2'-azobispropane, 1,1'-azo(methylethyl)diacetate, 2,2'-azobis(2-amidinopropane)hydrochloride, 2,2'-azobis(2-amidinopropane)-nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1'-azobis-1,2-diphenylethane, poly(bisphenol A-4,4'-azobis-4-cyanopentano-ate) and poly(tetraethylene glycol-2,2'-azobisisobutyrate); 1,4-bis(pentaethylene)-2-tetrazene; 1,4-dimethoxycarbonyl-1,4-dipheny-1-2-tetrazene, and the like; and mixtures thereof.

More typical free radical initiators include, but are not limited to, ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, sodium persulfate, potassium persulfate, diisopropyl peroxycarbonate and the like.

Based on total weight of the monomers to be polymerized, the initiator may be present in an amount from about 0.1% to about 5%, from about 0.4% to about 4%, from about 0.5% to about 3%, although may be present in greater or lesser amounts.

Chain Transfer Agent.

A chain transfer agent optionally may be used to control the polymerization degree of the latex, and thereby control the molecular weight and molecular weight distribution of the product latexes of the latex process and/or the toner process according to the present disclosure. As can be appreciated, a chain transfer agent can become part of the latex polymer.

In embodiments, the chain transfer agent has a carbon-sulfur covalent bond. The carbon-sulfur covalent bond has an absorption peak in a wave number region ranging from 500 to 800 $cm^{-1}$ in an infrared absorption spectrum. When the chain transfer agent is incorporated into the latex and the toner made from the latex, the absorption peak may be changed, for example, to a wave number region of 400 to 4,000 $cm^{-1}$.

Exemplary chain transfer agents include, but are not limited to, n-$C_{3-15}$ alkylmercaptans, such as, n-propylmercaptan, n-butylmercaptan, n-amylmercaptan, n-hexylmercaptan, n-heptylmercaptan, n-octylmercaptan, n-nonylmercaptan, n-decylmercaptan and n-dodecylmercaptan; branched alkylmercaptans, such as, isopropylmercaptan, isobutylmercaptan, s-butylmercaptan, tert-butylmercaptan, cyclohexylmercaptan, tert-hexadecylmercaptan, tert-laurylmercaptan, tert-nonylmercaptan, tert-octylmercaptan and tert-tetradecylmercaptan; aromatic ring-containing mercaptans, such as, allylmercaptan, 3-phenylpropylmercaptan, phenylmercaptan and mercaptotriphenylmethane; and so on. The terms, mercaptan and thiol may be used interchangeably to mean C—SH group.

Examples of such chain transfer agents also include, but are not limited to, dodecanethiol, butanethiol, isooctyl-3-mercaptopropionate, 2-methyl-5-t-butyl-thiophenol, carbon tetrachloride, carbon tetrabromide, and the like.

Based on total weight of the monomers to be polymerized, the chain transfer agent may be present in an amount from about 0.1% to about 7%, from about 0.5% to about 6%, from about 1.0% to about 5%, although the chain transfer agent may be present in greater or lesser amounts.

In embodiments, a branching agent optionally may be included in the first/second monomer composition to control the branching structure of the target latex. Exemplary branching agents include, but are not limited to, decanediol diacrylate (ADOD), trimethylolpropane, pentaerythritol, trimellitic acid, pyromellitic acid, and mixtures thereof.

Based on total weight of the monomers to be polymerized, the branching agent may be present in an amount from about 0% to about 2%, from about 0.05% to about 1.0%, from about 0.1% to about 0.8%, although the branching agent may be present in greater or lesser amounts.

In the latex process of the disclosure, emulsification may be done by any suitable process, such as, mixing at elevated temperature. For example, the emulsion mixture may be mixed in a homogenizer set at about 200 to about 400 rpm and at a temperature of from about 40° C. to about 80° C. for a period of from about 1 minute to about 20 minutes.

Any type of reactor may be used without restriction. The reactor can include means for stirring the compositions therein, such as, an impeller. A reactor can include at least one impeller. For forming the latex and/or toner, the reactor can be operated throughout the process such that the impellers can operate at an effective mixing rate of about 10 to about 1,000 rpm.

Following completion of the monomer addition, the latex may be permitted to stabilize by maintaining the conditions for a period of time, for example for about 10 to about 300 minutes, before cooling. Optionally, the latex formed by the above process may be isolated by standard methods known in the art, for example, coagulation, dissolution and precipitation, filtering, washing, drying, or the like.

In embodiments, the polymer latex comprises an aqueous dispersion of polyester. Any suitable or desired polyester can be used for the ink compositions herein. In embodiments, the polyester can be a material described in U.S. Pat. No. 6,593,049 and U.S. Pat. No. 6,756,176, which are each hereby incorporated by reference herein in their entireties. Suitable resins can also include a mixture of an amorphous polyester resin and a crystalline polyester resin as described in U.S. Pat. No. 6,830,860, which is hereby incorporated by reference herein in its entirety.

In a specific embodiment, the ink compositions herein include a polymer latex comprising an amorphous polyester, a crystalline polyester, or a mixture of amorphous polyester and crystalline polyester.

In embodiments, the resin can be a polyester resin formed by reacting a diol with a diacid in the presence of an optional catalyst. For forming a crystalline polyester, suitable organic diols include aliphatic diols having from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and the like, including their structural isomers.

The aliphatic diol can be selected in any suitable or desired amount, in embodiments, from about 40 to about 60 mole percent, or from about 42 to about 55 mole percent, or from about 45 to about 53 mole percent, and, in embodiments, a second diol can be selected in any suitable or desired amount, in embodiments, from about 0 to about 10 mole percent, or from about 1 to about 4 mole percent of the resin.

Examples of organic diacids or diesters including vinyl diacids or vinyl diesters that can be selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a diester or anhydride thereof, and mixtures and combinations thereof.

The organic diacid can be selected in any suitable or desired amount, in embodiments, from about 40 to about 60 mole percent, or from about 42 to about 52 mole percent, or from about 45 to about 50 mole percent, and in embodiments, a second diacid can be selected in any suitable or desired amount, such as from about 0 to about 10 mole percent of the resin.

Polyester based crystalline resins include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene-dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate).

Examples of diacid or diesters selected for the preparation of amorphous polyesters include dicarboxylic acids or diesters such as terephthalic acid, phthalic acid, isophthalic acid, fumaric acid, trimellitic acid, dimethylfumarate, dimethylitaconate, cis-1,4-diacetoxy-2-butene, diethyl fumarate, diethyl maleate, maleic acid, succinic acid, itaconic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures and combinations thereof. The organic diacid or diester may be present in any suitable or desired amount, for example, in an amount from about 40 to about 60 mole percent of the resin, or from about 42 to about 55 mole percent of the resin, or from about 45 to about 53 mole percent of the resin.

Examples of diols which can be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and mixtures and combinations thereof. The amount of organic diol selected can vary, and may be selected in any suitable or desire amount, for example, in an amount of from about 40 to about 60 mole percent of the resin, or from about 42 to about 55 mole percent of the resin, or from about 45 to about 53 mole percent of the resin.

In embodiments, polycondensation catalysts may be used in forming the polyesters. Polycondensation catalysts which may be utilized for either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, and mixtures and combinations thereof. Such catalysts may be utilized in any suitable or desired amount, such as from about 0.01 mole percent to about 5 mole percent based on the starting diacid or diester used to generate the polyester resin.

In embodiments, as noted above, an unsaturated, amorphous polyester resin may be utilized as the polyester herein. Examples of such resins include those disclosed in U.S. Pat. No. 6,063,827, the disclosure of which is hereby incorporated by reference herein in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly (propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be a an amorphous polyester such as a poly(propoxylated bisphenol A co-fumarate) resin having the formula

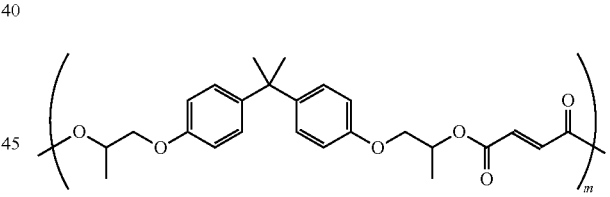

wherein m is an integer, in embodiments of from about 5 to about 1000, or from about 10 to about 500, or from about 15 to about 200.

An example of a linear propoxylated bisphenol A fumarate resin which may be utilized as a latex resin is the resin available under the trade name SPARII from Resana S/A Industrias Quimicas, Sao Paulo, Brazil. Other propoxylated bisphenol A fumarate resins that may be utilized and are commercially available include GTUF and FPESL-2 from Kao Corporation, Japan, and EM181635 from Reichhold, Research Triangle Park, N.C.

Suitable crystalline resins which may be utilized, optionally in combination with an amorphous resin as described above, include those disclosed in U.S. Patent Publication 2006/0222991, the disclosure of which is hereby incorporated by reference herein in its entirety. In embodiments, a suitable crystalline resin may include a resin formed of ethylene glycol and a mixture of dodecanedioic acid and fumaric acid co-monomers of the formula

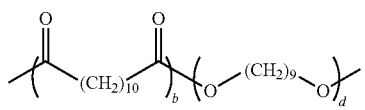

wherein b is an integer, in embodiments, of from about 5 to about 2,000 and d is an integer, in embodiments, of from about 5 to about 2,000.

For example, in embodiments, a poly(propoxylated bisphenol A co-fumarate) resin as described above may be combined with a crystalline resin to form a latex emulsion. In a specific embodiment, the ink composition herein includes a polymer latex comprising poly(co-propoxylated bisphenol co-terephthalate co-fumarate, a crystalline polyester, in embodiments, poly(1,9-nonanediol-co-dodecanedioic acid), or a mixture thereof.

In embodiments, the resin may possess acid groups which, in embodiments, may be present at the terminal of the resin. Acid groups which may be present include carboxylic acid groups, and the like. The number of carboxylic acid groups may be controlled by adjusting the materials utilized to form the resin and the reaction conditions.

In embodiments, the polyester resin may have an acid number from about 2 mg KOH/g of resin to about 200 mg KOH/g of resin, or from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all of the acid groups on the resin identified as the end point of the titration.

The composite latex particle can be prepared by any suitable means as known in the art. For example, the composite latex particle can be prepared using a two-step emulsion polymerization process, a self-emulsification process in which a first monomer is diffused into a second monomer in an aqueous dispersion and then polymerized, a dispersion polymerization including preparation of a core-shell particle wherein either of the amorphous or crystalline polyester can be selected for the core or the shell, among other methods as would be apparent to one of skill in the art.

In embodiments, the polyester emulsion or latex has a volume average particle size of from about 20 nanometers (nm) to about 1000 nm, or from about 20 to about 800 nm, or from about 50 to about 800 nm, or from about 50 to about 500 nm, or from about 50 to about 300 nm, or from about 100 to about 300 nanometers. In a specific embodiment, the polymer latex has a volume average particle size of less than about 200 nanometers, in embodiments from about 20 to less than about 200 nanometers.

The characteristics of the latex may be determined by any suitable technique and apparatus. Volume average particle diameter may be measured by means of a measuring instrument such as a light scattering particle sizer, operated in accordance with the manufacturer's instructions. Volume average particle diameter may also be measured by means of a measuring instrument such as a Beckman Coulter Multisizer 3, operated in accordance with the manufacturer's instructions.

In a specific embodiment, the polyester is a compound of the formula

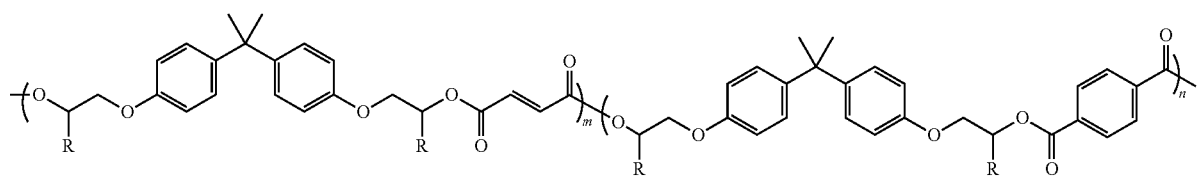

wherein R is hydrogen or methyl, m is an integer of from about 2 to about 10, and n is an integer of from about 2 to about 10.

In embodiments, the polymer latex comprises a combination of amorphous polymer and crystalline polyester present in a ratio of 90 percent amorphous polyester and 10 percent crystalline polyester, by weight, based on the total weight of both the amorphous and crystalline polyester.

In embodiments, the polymer latex may be present in any desired or effective amount, such from about 0.1 to about 25 percent, or from about 1 to about 20 percent, or from about 3 to about 20 percent, or from about 2 to about 14 percent, by weight, based on the total weight of the ink composition.

In specific embodiments, the polymer latex is provided in an amount such that the total solids content of the aqueous ink is from about 2 to about 25 percent, or from about 7 to about 15 percent by weight based on the total weight of the aqueous ink composition.

Low Molecular Weight Humectant Solute.

The aqueous ink compositions include a low molecular weight humectant solute that improves latency by binding water and reducing the vapor pressure of water/co-solvent mixture (Raoult's Law). The solute can be used to improve latency under low Rh conditions and recoverability.

The low molecular weight humectant solute can comprise any suitable or desired material.

In embodiments, the low molecular weight humectant solute has a molecular weight of from about 100 g/mole to about 3,000 g/mole, or from about 100 g/mole to about 2,000 g/mole, or from about 100 g/mole to about 1,000 g/mole.

The low molecular weight humectant solute can be selected from the group consisting of betaine, betaine derivatives, polyols, sugars, and mixtures and combinations thereof. In a specific embodiment, the low molecular weight humectant solute is betaine.

As described in the online encyclopedia "Wikipedia," betaine in chemistry is any neutral chemical compound with a positively charged cationic functional group such as a quaternary ammonium or phosphonium cation (generally: onium ions) which bears no hydrogen atom and with a negatively charged functional group such as a carboxylate group which may not be adjacent to the cationic site. A betaine thus may be a specific type of zwitterion.

Betaine as used herein may be selected from the materials described in Kuczera et al., "Amphiphilic derivatives of betaine esters as modifiers of macrovesicular BLM," Gen Physiol. Biophys. 1989 June; 8(3):223-32, which Abstract thereof describes a series of amphiphilic derivatives of betaine esters (V-n), with the chemical structure $(CH_3)_{3N}+COOC_nH_{2n}+1Cl^-$ (n=10, 12, 14 or 16) were studied with respect to their effects on the electrical properties of lecithin macrovesicular membranes. Normalized resistance and breakdown voltage were found to depend on the V-n concentration in the membrane and on the alkyl chain length (n). Resistance decreases up to about 10(4) ohm $cm^2$ and breakdown voltage decreases by 111 mV were detected in the V-n:lecithin molar ratio range measured (0.005-0.05). Maximal decrease in breakdown voltage was observed for V-14. These findings together with the featured anionic selectivity suggest that, due to the interaction of V-n with phospholipids, hydrophilic pores are formed in the lipid bilayers. This assumption is supported by the results obtained by electron paramagnetic resonance (EPR) measurements which showed no collective changes in bilayer dynamics or ordering. In particular, rotational correlation times and order parameters of the spin probe molecules dissolved in the membrane did not change in the concentration range tested. Since a large number of defects in the membrane can be expected to influence the collective ordering and dynamics, this observation also suggest that the number of pores formed is small.

See also, Betaines and Related Osmoprotectants. Targets for Metabolic Engineering of Stress Resistance," by McNeil, et al, Plant Physiology, August 199, Vol. 120, pp. 945-949, which is hereby incorporated by reference herein in its entirety.

Betaine as used herein may be selected from the materials described in U.S. Pat. No. 6,384,266, which is hereby incorporated by reference herein in its entirety. U.S. Pat. No. 6,384,266 describes in the Abstract thereof an environmentally acceptable method of producing glycine betaine esters that produces no toxic by-products during the synthesis. The method produces only product, recyclable material for reuse in the process, and recovered material which can be sold for uses, such as fertilizer.

Betaine as used herein may also be selected from the betaine derivatives described in U.S. Pat. No. 2,429,171, which is hereby incorporated by reference herein in its entirety. U.S. Pat. No. 2,429,171 describes derivatives of betaines obtained by causing organic compounds containing an active hydrogen or metal atom which is replaceable by an acyl group, to react with acid halides or anhydrides of betaine salts. As described in U.S. Pat. No. 2,429,171, starting materials can be aliphatic alcohols such as stearyl alcohol, alicyclic alcohols such as menthol, vitamin A and the alcohols of the steroid series such as testosterone, androsterone, corticosterone, desoxycorticosterone and dehydrocorticosterone; phenols, cresols, chlorphenols, oestrone, oestradiol or its monoesters, vitamin E, 2-methyl-naptohydroquinone, genins of synthetic or naturally occurring cardiac substances and their glycosides, such as strophanthidin, strophanthin, digitoxigenin, gitoxin, gitoxigenin; primary and secondary amines or corresponding alkaloids; β-diketones, β-ketocarboxylic acid derivatives, the corresponding metal compounds, etc. The acid halides or anhydrides of betaine salts used for the reaction can be obtained from betaines, their salts or ester salts, by the action of agents which are suitable for converting carboxylic acids or their salts into the corresponding acid halides or anhydrides. In embodiments, the betaine derivatives comprise those prepared by treating members selected from the group consisting of cardiac glycosides and their aglycones which contain a member of the group consisting of an active hydrogen atom and an active metal atom, both being replaceable by an acyl group, with a member of the group of acid halides and anhydrides of betaine salts. In embodiments, the betaine derivatives comprise those prepared by treating members selected from the group consisting of cardiac glycosides and their aglycones which contain a member of the group consisting of an active hydrogen atom and an active metal atom, both being replaceable by an acyl group, in mixture with organic compounds which are not capable of being acylated, with a member of the group of acid halides and anhydrides of betaine salts, separating the acylated from the unchanged substances and regenerating the parent substances of the former compounds by means of hydrolyzing agents. In embodiments, the betaine derivative is selected from the group consisting of an ester of the cholesteryl ester of betaine hydrochloride, the strophanthidine ester of betaine hydrochloride, Δ-3:21-dihydroxy-nor-choladienic acid lactone esterified in the 3-position with betaine hydrochloride, the menthyl ester of betaine hydrochloride, stearyl ester of betaine hydrochloride, the derivative of para-hydroxy-benzoic acid menthyl ester with the acid chloride of betaine hydrochloride, an estrogenically active hydroxylated cyclopentanopolyhydrophenathrene with a betaine salt, an ester of desoxycorticosterone with a betaine salt, and ester of an aglycone of a cardiac glycoside with a betaine salt, and mixtures and combinations thereof.

Betaine as used herein may also be selected from the betaine derivatives described in U.S. Pat. No. 6,384,266, which is hereby incorporated by reference herein in its entirety. U.S. Pat. No. 6,384,266 describes a method of synthesis of betaine esters comprising (a) adding hydrochloric acid to a glycine betaine in a sufficient quantity to produce one mole of betaine hydrochloride for each mole of hydrochloric acid; (b) dissolving said betaine hydrochloride in water and adding concentrated hydrochloride acid to adjust pH to 2; (c) chilling said solution for up to 24 hours, adding ethanol to facilitate formation of betaine hydrochloride crystals, filtering said betaine hydrochloride crystals, and drying said betaine hydrochloride crystals, (d) recycling the water-ethanol solution fraction for use in the next batch; (e) charging a reactor with a fatty acid derived alcohol and applying heat to liquidity the fatty acid derived alcohol, (f) adding said betaine hydrochloride crystals and an acid catalyst; (g) applying agitation and maintaining temperature; (h) reacting mixture until esterification is complete, cooling said mixture, and adding a neutralization agent to neutralize the acid catalyst; (i) purifying, crystallizing and drying the betaine ester product.

The low molecular weight humectant solute can comprise polyols, sugars, and mixtures and combinations thereof. Any suitable or desired polyol or sugar can be selected. In embodiments, a polyol solute having a melting point of from about 55 to about 200° C., or from about 62 to about 165° C. is selected. In selected embodiments, the low molecular weight humectant solute is selected from the group consisting of sorbitol, maltitol, mannitol, xylitol, isosorbide, and mixtures and combinations thereof. These materials are commercially available from Roquette, France.

In certain embodiments, the betaine derivative is that available as Alkolan® CP 30 and Alkolan® CAP 30 from Oxiteno comprising alkyl amidopropyl betaines based on natural, renewable sources, having the following general structure:

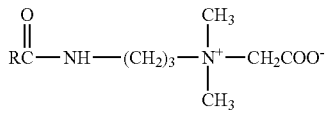

where R represents the alkyl group which is derived from coconut oil for Alkolan® CP 30 and of a C8/C10 carbon chain length distribution derived from palm kernel oil for Alkolan® CAP 30. In certain embodiments, the betaine derivative is that available as Alkolan® CD 30 from Oxiteno comprising an alkyl betaine having the structure

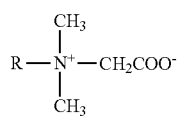

where R represents the alkyl group which is derived from coconut oil.

In certain embodiments, the betaine derivative is selected from the group consisting of glycine betaine of the formula

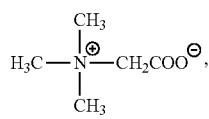

propio betaine (PB), N,N,N-trimethyl-N-(2-carboxyethyl) ammonium, inner salt, CAS #6458-06-6, of the formula

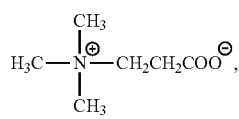

deanol betaine (DB), N,N-dimethyl-N-(2-hydroxyethyl)-N-carboxymethyl ammonium, inner salt, CAS #7002-65-5, of the formula

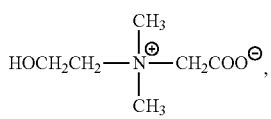

homodeanol betaine (HDB), N,N-dimethyl-N-(2-hydroxyehtyl)-N-(2-carboxyethyl)ammonium, inner salt, CAS #6249-53-2, of the formula

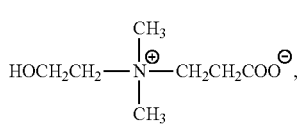

homoglycerol betaine (HGB), N,N-dimethyl-N-(2,3-dihydroxypropyl)-N-(2-carboxyethyl)ammonium, inner salt, of the formula

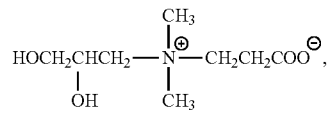

diethanol homobetaine (DEHB), N,N-diethanol-N-methyl-N-(2-carboxyethyl)ammonium, inner salt, CAS#43192-67-2, of the formula

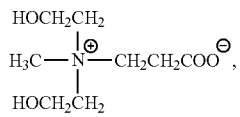

triethanol homobetaine (TEHB), N,N,N-triethanol-N-(2-carboxyetyl)ammonium, inner salt, CAS#857163-31-6, of the formula

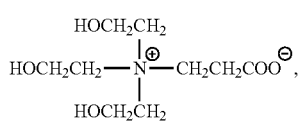

hydroxypropyl homobetaine (HPHB), N,N-dimethyl-N-(3-hydroxypropyl)-N-(2-carboxyethyl)ammonium, inner salt, of the formula

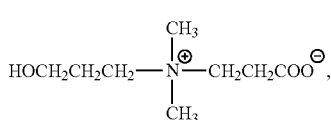

dimethylthetin (DMT), N,N-dimethyl-N-carboxymethyl sulfonium, inner salt, CAS #4727-41-7, of the formula

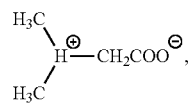

a cyclic betaine (CB-1), N-methyl-N-(2-carboxyethyl) morpholinium, inner salt, of the formula

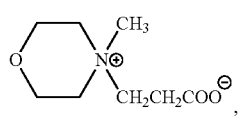

a sulfobetaine (SB-1), N,N-dimethyl-N-(2-hydroxyehtyl)-N-(2-sulfoethyl)ammonium, inner salt, CAS #91673-91-5,

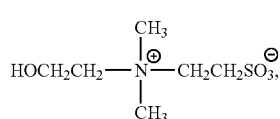

and mixtures and combinations thereof.

The betaine derivatives can be prepared by any suitable or desired process including those described above. In embodiments, the betaine derivatives are prepared as described in "Betaine Analogues and Related Compounds for Biomedical Applications," a thesis prepared by Madhusudan Vasudevamurthy, 2006, Department of Chemical and Process Engineering, University of Canterbury, Christchurch, New Zealand, which is incorporated by reference herein in its entirety. Chapter 3, pages 35-36 of the Vasudevamurthy thesis describes syntheses of certain compensatory solutes.

In embodiments, the low molecular weight humectant solute can be present in any suitable or desired amount, such as of from about 0.01 to about 10, or from about 1 to about 8, or from about 2 to about 6 percent by weight, based on the total weight of the ink composition.

In specific embodiments, the low molecular weight humectant solute is provided in an amount such that the total solids content of the aqueous ink is from about 2 to about 5 percent by weight based on the total weight of the aqueous ink composition.

Surfactant.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethyl ammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL C0-720™, IGEPAL C0-290™, IGEPAL CA-21O™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich®, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C 12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

In embodiments, betaine can function as a surfactant. Source and foam properties of selected betaines are provided in the Table 1 taken from web site Cosmetics & Toiletries® Science Applied, which can be found online at world wide web address http://www.cosmeticsandtoiletries.com/ and where the Table is linked at the web address http://www.cosmeticsandtoiletries.com/formulating/function/surfactant/125075 444.html.

TABLE 1

| INCI Name | Designation | Derived From | Foam Properties |
|---|---|---|---|
| Cocamidopropyl Betaine | COAB | Coconut oil | Highest overall foam height but the least stable, quickest flash foam |
| Lauramidopropyl Betaine | LMAB | Lauric Myristic Fatty Acid | Densest foam, but less voluminous than COAB, requires more agitation |
| Cetyl Betaine | CET | Cetyl dimethyl amine | Second to LMB in density of foam, but has the longest sustained foam COB |
| Cocamidopropyl Betaine (and) Oleamidopropyl Betaine | COB | Coconut Oil/Oleic Acid | Moderate foaming in comparison to others, good flash foam with open structure |
| Ricinoleamidopropyl Betaine | ROAB | Castor Oil | Moderate foamer with creamy after feel |
| Dimer Dilinoleamidopropyl Betaine | DLB | Dimer Acid | Moderate foamer with sustained foam and good after feel |

Betaine derivatives having a long alkyl chain can function as a surfactant. By long alkyl chain, it is meant that the betaine derivative has an alkyl chain having from about 6 to about 32, or from about 8 to about 24, or from about 10 to about 18 carbon atoms. In embodiments, the surfactant herein can be a betaine selected from the group consisting of lauramidopropyl betaine, oleamidopropyl betaine, lauryl betaine, sarkosyl, dodecyl betaine, and mixtures and combinations thereof.

Betaines of higher molecular weight can function as a surfactant. Certain betaine derivatives are hydrotropes depending on the molecular weight. Hydrotropes are compounds that solubilize hydrophobic compounds in aqueous solutions.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases. In specific embodiments, the surfactant is provided in an amount such that the total solids content of the aqueous ink is from about 2 to about 25 percent, or from about 7 to about 15 percent by weight based on the total weight of the aqueous ink composition.

Additives.

The ink composition can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, surface active components, and the like, as well as mixtures thereof. The surface active components can be adjusted to meet wetting requirements of the targeted substrates or intermediates.

The ink may also contain trehalose of the formula

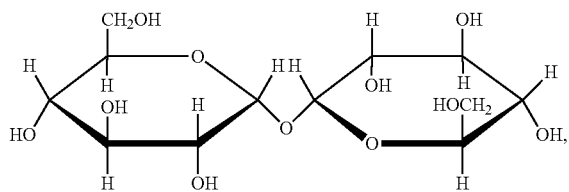

sorbitol of the formula

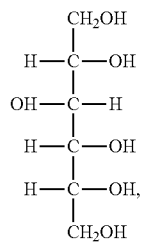

or a mixture or combination thereof.

In embodiments, the ink composition is a low-viscosity composition. The term "low-viscosity" is used in contrast to conventional high-viscosity inks such as screen printing inks, which tend to have a viscosity of at least 1,000 centipoise (cps). In specific embodiments, the ink disclosed herein has a viscosity of no more than about 100 cps, no more than about 50 cps, or no more than about 20 cps, or no more than about 15 cps, or from about 2 to about 30 cps at a temperature in the range of from about 20 about 40° C., or from about 2 to about 20 cps at a temperature in the range of from about 30 about 40° C., although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is at least about 1 centipoise, no more than about 10 centipoise, no more than about 7 centipoise, or no more than about 5 centipoise, although the viscosity can be outside of these ranges. For piezoelectric ink jet printing, at the jetting temperature, the ink viscosity is at least about 2 centipoise, at least about 3 centipoise, no more than about 20 centipoise, no more than about 15 centipoise, or no more than about 10 centipoise, although the viscosity can be outside of these ranges. The jetting temperature can be as low as about 20 to 25° C., and can be as high as about 70° C., as high as about 50° C., or as high as about 40° C., although the jetting temperature can be outside of these ranges.

In certain embodiments, the ink compositions herein have a viscosity of from about 2 to about 20 centipoise at a temperature of about 30° C.

The ink compositions herein have selected surface tension characteristics that provide wetting and release properties suitable for indirect printing applications. In embodiments, the ink composition is selected to provide a surface tension, viscosity, and particle size that is suitable for use in a piezoelectric ink jet print head.

In embodiments, the ink composition herein has a surface tension of from about 15 to about 50 dynes per centimeter (mN/m), or from about 18 to about 38 dynes per centime, or from about 20 to about 35 dynes per centimeter, although the surface tension can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

In a specific embodiment, the inks are prepared as follows: 1) preparation of a polymer latex optionally stabilized with a surfactant; 2) preparation of a dispersion of a colorant optionally stabilized with a surfactant; 3) mixing of the polymer latex with the colorant dispersion; 4) optional filtering of the mixture; 5) addition of other components such as water, co-solvents, and optional additives; and 6) optional filtering of the composition.

Also disclosed herein is a process which comprises applying an ink composition as disclosed herein to a substrate in an imagewise pattern.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, a process herein comprises incorporating an ink prepared as disclosed herein into an ink jet printing apparatus, ejecting ink droplets in an imagewise pattern onto an intermediate transfer member, heating the image to partially or completely remove solvents, and transferring the ink in the imagewise pattern from the intermediate transfer member to a final recording substrate. In a specific embodiment, the intermediate transfer member is heated to a temperature above that of the final recording sheet and below that of the ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed as the final recording sheet, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Inks were formulated containing a solute (betaine), a partially cross-linked styrene acrylate, and encapsulated pigments (CMYK) available from Sun Chemicals. The inks were shown to have good jetting performance, and recoverability in a Dimatix printer. The black ink was subsequently printed with a Kyocera print head. The black ink showed good jetting performance.

Example 1

Preparation of Emulsion Polymerization Latex

A latex emulsion comprised of polymer particles generated from the emulsion polymerization of styrene, n-butyl acrylate, methacrylic acid, beta-CEA and DOWFAX™ 2A1, an alkyldiphenyloxide disulfonate surfactant from Dow Chemical Company, was prepared as follows.

A surfactant solution of 1.99 grams DOWFAX™ 2A1 and 285.43 grams de-ionized water was prepared by mixing for 10 minutes in a stainless steel holding tank. The holding tank was then purged with nitrogen for 5 minutes before transferring into the reactor. The reactor was then continuously purged with nitrogen while being stirred at 450 rpm. The reactor was then heated up to 80° C. at a controlled rate, and held there. Separately, 4.38 grams of ammonium persulfate initiator was dissolved in 45.52 grams of de-ionized water.

Separately, the monomer emulsion was prepared in the following manner. 229.13 grams of styrene, 62.69 grams of butyl acrylate, 45.39 grams methacrylic acid, 10.12 grams of beta-CEA, 2.07 grams of 1-dodecanethiol, 1.18 grams of 1,10-decanediol diacrylate (ADOD) were added to a premix of 11.27 grams of DOWFAX™ 2A1 in 152.91 grams of deionized water were mixed to form an emulsion. 1% of the above emulsion (4.3 grams) was then slowly dropped into the reactor containing the aqueous surfactant phase at 80° C. to form the "seeds" while being purged with nitrogen. The initiator solution was then slowly charged into the reactor. The monomer emulsion was split into two aliquots, 252.2 grams of the monomer emulsion was initially feed into the reactor at 2.03 grams/minute. The second aliquot of 259.8 grams monomer emulsion was mixed with 2.45 grams of DDT and added to the reactor at 2.89 grams/minute. Once all the monomer emulsion was charged into the main reactor, the temperature was held at 80° C. for an additional 2 hours to complete the reaction. Full cooling was then applied and the reactor temperature was reduced to 25° C. The product was collected into a holding tank and sieved with a 25 μm screen.

The particle size was then measured using a Nanotrac® U2275E particle size analyzer and was determined to have a D50 of 131.3 nanometers and a D95 of 187.9 nanometers.

Ink Preparation.

Inks were prepared by mixing the ink components as per the Tables below in the following manner:
1. Latex was added to water, followed by TEA, and the mixture was stirred for 2 minutes at 300 RPM;
2. Pigment was then added while stirring, the ink being stirred for an additional 2 minutes at 300 RPM;
3. The co-solvents were then added and the solution stirred for an additional 1 minute or more at 500 RPM;
4. Addition of optional anti-foaming additive (1 minute at 500 RPM);
5. Addition of surfactant(s), (e.g.: 104H, S761p);
6. The ink was stirred for a minimum of 45 minutes at 500 RPM;
7. The ink was filtered through a 0.45 micron filter before testing.

Example 2

A betaine ink without defoamer was prepared as described above and having the components shown in Table 2.

TABLE 2

| Component | Solids Weight Percent | Solids | Weight Percent | m/g |
|---|---|---|---|---|
| Latex of Example 1 | 4.35 | 44.75 | 9.72 | 106.93 |
| Glycine Betaine | 3.50 | 100 | 3.50 | 38.50 |
| 2-pyrrolidone | 2.50 | 100 | 2.50 | 27.50 |
| Glycerol | 10.00 | 100 | 10.00 | 110.00 |
| TEA | 1.00 | 100 | 1.00 | 11.0 |
| 104H | 0.20 | 100 | 0.20 | 2.20 |
| Sun Pigment | 3.65 | 15.00 | 24.33 | 267.67 |
| 1,5-pentanediol | 20.30 | 100.00 | 20.30 | 223.30 |
| sS761p | 0.0075 | 100.00 | 0.0075 | 0.0825 |
| Water | 54.49 | 100 | 28.44 | 312.82 |
|  | 100 |  | 100 | 1100 | m/g is the actual mass used in grams.

TEA is triethanol amine (>98%) from Sigma-Aldrich® (used for pH control).

104H is Surfynol® 104H Surfactant, Air Products—Additives.

Chemguard® S-761p is a short-chain perfluoro-based anionic fluorosurfactant of the phosphate ester type available from Chemguard®.

Example 3

A betaine ink with defoamer was prepared as described above and having the components shown in Table 3.

TABLE 3

| Component | Solids Weight Percent | Solids | Weight Percent | m/g |
|---|---|---|---|---|
| Latex of Example 1 | 4.35 | 44.75 | 9.72 | 2.43 |
| Glycine Betaine | 3.50 | 100 | 3.50 | 0.88 |
| 2-pyrrolidone | 2.50 | 100 | 2.50 | 0.63 |
| Glycerol | 10.00 | 100 | 10.00 | 2.50 |
| TEA | 1.00 | 100 | 1.00 | 0.25 |
| 104H | 0.20 | 100 | 0.20 | 0.05 |
| Sun Pigment | 3.65 | 15.00 | 24.33 | 6.08 |
| 1,5-pentanediol | 20.30 | 100.00 | 20.30 | 5.08 |
| 2-ethyl-1-hexanol | 1.00 | 100.00 | 1.00 | 0.25 |
| sS761p | 0.0075 | 100.00 | 0.0075 | 0.0019 |
| Water | 53.49 | 100 | 27.44 | 6.86 |
|  | 100 |  | 100 | 25 |

Inks containing 104H surfactant were found to have low foaming characteristics, less than 2 millimeters under standard foam test conditions (10 millimeters of solutions being tested), slight foaming seen with inks containing 104H and S761p, foaming can be further reduced with addition of antifoaming additive such as 2-ethyl-1-hexanol.

A full ink set was prepared utilizing Sun Chemicals encapsulated pigments.

Example 4

A cyan ink was prepared as described above and having the components shown in Table 4.

TABLE 4

| Component | Solids Weight Percent | Solids | Weight Percent | m/g |
|---|---|---|---|---|
| Latex of Example 1 | 4.35 | 41.64 | 10.45 | 2.61 |
| Betaine | 3.50 | 100 | 3.50 | 0.88 |
| 2-pyrrolidone | 2.50 | 100 | 2.50 | 0.63 |
| Glycerol | 10.00 | 100 | 10.00 | 2.50 |
| TEA | 1.00 | 100 | 1.00 | 0.25 |
| 104H | 0.20 | 100 | 0.20 | 0.05 |
| Sun Pigment Concentrate | 3.00 | 15.00 | 20.00 | 5.00 |
| 1,5-pentanediol | 20.30 | 100.00 | 20.30 | 5.08 |
| sS761p | 0 | 100.00 | 0 | 0.000 |
| Water | 55.15 | 100 | 32.0533 | 8.01 |
|  | 100 |  | 100 | 25 |

Example 5

A magenta ink was prepared as described above and having the components shown in Table 5.

TABLE 5

| Component | Solids Weight Percent | Solids | Weight Percent | m/g |
|---|---|---|---|---|
| Latex of Example 1 | 4.35 | 41.64 | 10.45 | 5.22 |
| Betaine | 3.50 | 100 | 3.50 | 1.75 |
| 2-pyrrolidone | 2.50 | 100 | 2.50 | 1.25 |
| Glycerol | 10.00 | 100 | 10.00 | 5.00 |
| TEA | 1.00 | 100 | 1.00 | 0.50 |
| 104H | 0.20 | 100 | 0.20 | 0.10 |
| Sun Pigment Concentrate | 2.70 | 15.00 | 18.00 | 9.00 |
| 1,5-pentanediol | 20.30 | 100.00 | 20.30 | 10.15 |
| sS761p | 0 | 100.00 | 0 | 0.000 |
| Water | 55.45 | 100 | 34.0533 | 17.03 |
|  | 100 |  | 100 | 50 |

Example 6

A yellow ink was prepared as described above and having the components shown in Table 6.

TABLE 6

| Component | Solids Weight Percent | Solids | Weight Percent | m/g |
|---|---|---|---|---|
| Latex of Example 1 | 4.35 | 41.64 | 10.45 | 5.22 |
| Betaine | 3.50 | 100 | 3.50 | 1.75 |
| 2-pyrrolidone | 2.50 | 100 | 2.50 | 1.25 |
| Glycerol | 10.00 | 100 | 10.00 | 5.00 |
| TEA | 1.00 | 100 | 1.00 | 0.50 |
| 104H | 0.20 | 100 | 0.20 | 0.10 |
| Sun Pigment Concentrate | 3.30 | 13.90 | 23.74 | 11.87 |
| 1,5-pentanediol | 20.30 | 100.00 | 20.30 | 10.15 |
| sS761p | 0 | 100.00 | 0 | 0.000 |
| Water | 54.85 | 100 | 28.3123 | 14.16 |
|  | 100 |  | 100 | 50 |

Example 7

A cyan ink was prepared as described above and having the components shown in Table 7.

TABLE 7

| Component | Solids Weight Percent | Solids | Weight Percent | m/g |
|---|---|---|---|---|
| Latex of Example 1 | 4.35 | 41.64 | 10.45 | 2.61 |
| Betaine | 3.50 | 100 | 3.50 | 0.88 |
| 2-pyrrolidone | 2.50 | 100 | 2.50 | 0.63 |
| Glycerol | 10.00 | 100 | 10.00 | 2.50 |
| TEA | 1.00 | 100 | 1.00 | 0.25 |
| 104H | 0.20 | 100 | 0.20 | 0.05 |
| Sun Pigment Concentrate | 3.00 | 15.00 | 20.00 | 5.00 |
| 1,5-pentanediol | 20.30 | 100.00 | 20.30 | 5.08 |
| sS761p | 0.0075 | 100.00 | 0.0075 | 0.0019 |
| Water | 55.14 | 100 | 32.0458 | 8.01 |
|  | 100 |  | 100 | 25 |

Example 8

A black ink was prepared as described above and having the components shown in Table 8.

TABLE 8

| Component | Solids Weight Percent | Solids | Weight Percent | m/g |
|---|---|---|---|---|
| Latex of Example 1 | 4.35 | 41.64 | 10.45 | 5.22 |
| Betaine | 3.50 | 100 | 3.50 | 1.75 |
| 2-pyrrolidone | 2.50 | 100 | 2.50 | 1.25 |
| Glycerol | 10.00 | 100 | 10.00 | 5.00 |
| TEA | 1.00 | 100 | 1.00 | 0.50 |
| 104H | 0.20 | 100 | 0.20 | 0.10 |
| Sun Pigment Concentrate | 3.30 | 13.90 | 23.74 | 11.87 |
| 1,5-pentanediol | 20.30 | 100.00 | 20.30 | 10.15 |
| sS761p | 0 | 100.00 | 0 | 0.000 |
| Water | 54.85 | 100 | 28.3123 | 14.16 |
| | 100 | | 100 | 50 |

Example 9

A betaine ink without defoamer was prepared as described above and having the components shown in Table 9.

TABLE 9

| Component | Solids Weight Percent | Solids | Weight Percent | m/g |
|---|---|---|---|---|
| Latex of Example 1 | 4.35 | 44.75 | 9.72 | 106.93 |
| Alkolan ® CD 30 | 0.35 | 100 | 3.50 | 38.50 |
| 2-pyrrolidone | 2.50 | 100 | 2.50 | 27.50 |
| Glycerol | 10.00 | 100 | 10.00 | 110.00 |
| TEA | 1.00 | 100 | 1.00 | 11.0 |
| 104H | 0.20 | 100 | 0.20 | 2.20 |
| Sun Pigment | 3.65 | 15.00 | 24.33 | 267.67 |
| 1,5-pentanediol | 20.30 | 100.00 | 20.30 | 223.30 |
| sS761p | 0.0075 | 100.00 | 0.0075 | 0.0825 |
| Water | 57.64 | 100 | 28.44 | 312.82 |
| | 100 | | 100 | 1100 |

Alkolan® CD 30 coco-betaine available from Oxiteno.

The inks were shown to have very similar properties and were stable to freeze, thaw, and accelerated aging at 60° C. for a period of 3 days.

Ink properties are shown in Tables 10, 12, 13 and 14.

Particle size was determined using a Malvern Zetasizer.

Surface tension was measured on a K-100 Surface Tensiometer, available from Krüss GmbH, equipped with a Wilhelmy plate, at room temperature of about 27° C. Surface tension data was determined over an average of 20 data points taken from 1 second to 60 seconds.

The viscosity data were obtained at 35° C. on an ARES-G2 controlled strain rheometer with a Peltier temperature control system for rapid heating/cooling.

TABLE 10

| Example | Pigment | Viscosity (cps) | D10 | D50 | D95 | PdI | Z Average Diameter | Count Rate | Surface Tension (mN/m) |
|---|---|---|---|---|---|---|---|---|---|
| 4 | Cyan | 4.85 | 68.4 | 122 | 258 | 0.224 | 104 | 378 | 36.16 |
| 5 | Magenta | 4.67 | 85.3 | 146 | 292 | 0.18 | 131 | 434 | 36.11 |
| 6 | Yellow | 4.60 | 85.8 | 144 | 275 | 0.216 | 122 | 476 | 35.89 |
| 7 | Cyan | — | — | — | — | — | — | — | 24.01 |

TABLE 11

Freeze-Thaw

| Example | Pigment | Viscosity (cps) | D10 | D50 | D95 | PdI | Z Average Diameter | Count Rate | Surface Tension (mN/m) |
|---|---|---|---|---|---|---|---|---|---|
| 4 | Cyan | 5.34 | 69.5 | 130 | 303 | 0.245 | 108 | 354 | — |
| 5 | Magenta | 4.78 | 90.8 | 151 | 284 | 0.175 | 134 | 421 | — |
| 6 | Yellow | 4.88 | 88.8 | 142 | 258 | 123.3 | 197 | 481 | — |

TABLE 12

Aged 5 Days at 60° C.

| Example | Pigment | Viscosity (cps) | D10 | D50 | D95 | PdI | Z Average Diameter | Count Rate | Surface Tension (mN/m) |
|---|---|---|---|---|---|---|---|---|---|
| 4 | Cyan | 5.79 | 71.6 | 130 | 279 | 0.225 | 112 | 371 | 36.43 |
| 5 | Magenta | 4.96 | 94.5 | 154 | 288 | 0.164 | 138.1 | 437 | 36.59 |
| 6 | Yellow | 4.80 | 84.7 | 145 | 290 | 0.212 | 124.9 | 479 | 36.60 |

TABLE 13

Aged 1 Week on Bench (Room Temperature)

| Example | Pigment | Viscosity (cps) |
|---|---|---|
| 5 | Magenta | 4.87 |
| 6 | Yellow | 4.96 |
| 7 | Cyan | 4.99 |

The black ink containing fluoro surfactant and anti-foaming additive was printed on a print fixture using a Kyocera print head after being aged for 2 months at room temperature, demonstrating that the inks have good shelf life.

The inks were successfully printed using a Dimatix Printer (DMP 2800, Fujifilm USA). The inks were jetted on a Dimatix 2800 printer onto Epson® Premium Photopaper. Test key parameters were:

Drop mass: 6.8-7.0 ng;

Drop velocity: 8 m/s;

Frequency: 5 KHz;

Voltage: 19-23 V.

Test parameters are shown in Table 14.

TABLE 14

| | Example | | | |
|---|---|---|---|---|
| | 8 | 5 | 6 | 7 |
| Pigment | Black | Magenta | Yellow | Cyan |
| Drop Mass (ng) | 7.0 | 7.0 | 7.0 | 6.8 |
| Continuous Jetting* | 1st Set: None 2nd Set: None | 1st Set: None 2nd Set: None | 1st Set: None 2nd Set: None | 1st Set: None 2nd Set: None |
| Latency (2 minutes) | Pass | Pass | Pass | Pass |
| # of the First Visually Detectable Drop | 0 min: 1st 2 min: 1st | 0 min: 1st 2 min: 1st | 0 min: 2nd 2 min: 2nd | 0 min: 1st 2 min: 1st |
| Overnight Head Stability Purge | Yes | Yes | Yes | Yes |

*Continuous jetting for 15 minutes with no plugged nozzles.

Latency of 2 minutes means that the ink can remain idle without jetting for 2 minutes without detectable defects upon resuming printing.

All of the inks jetted well on Dimatix. All of the inks passed the overnight head stability test.

The diameter and circularity of the ink dots after printing are shown in Table 15.

TABLE 15

| Ink Example | Dot Diameter (micrometers) | Dot Diameter (Average-micrometers) | Circularity | Circularity (Average) |
|---|---|---|---|---|
| 5 | 40.9 | 39.64 | 0.9 | 0.87 |
| 6 | 39.6 | 39.87 | 0.9 | 0.87 |
| 7 | 40.1 | 39.05 | 0.9 | 0.88 |
| 8 | 40.2 | 39.52 | 0.9 | 0.88 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art an which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An aqueous ink composition comprising:
   water;
   a co-solvent;
   an encapsulated resinous pigment;
   a polymer latex; and
   a low molecular weight humectant solute;
   wherein the total solids content of the aqueous ink is from about 2 to about 25 percent by weight based on the total weight of the aqueous ink composition.

2. The aqueous ink of claim 1, wherein the total solids content of the aqueous ink is from about 7 to about 15 percent by weight based on the total weight of the aqueous ink composition.

3. The aqueous ink of claim 1, wherein the co-solvent has a solubility parameter in the range of from about 27 to about 37 $MPa^{1/2}$.

4. The aqueous ink of claim 1, wherein the co-solvent is selected from the group consisting of 1,5-pentanediol, 2-pyrollidone, glycerol, and mixtures thereof; and
   wherein the individual co-solvent or mixture of co-solvents has a solubility parameter in the range of from about 27 to about 33 $MPa^{1/2}$.

5. The aqueous ink of claim 1, wherein the co-solvent is 1,5-pentanediol;
   wherein the co-solvent is 2-pyrollidone; or
   wherein the co-solvent is a mixture of 1,5-pentanediol and 2-pyrollidone.

6. The aqueous ink of claim 1, wherein the encapsulated resinous pigment comprises encapsulated resinous pigment particles having a Z average particle size of from about 60 to about 250 nanometers.

7. The aqueous ink of claim 1, wherein the polymer latex comprises a latex emulsion comprising polymer particles generated from the emulsion polymerization of styrene, n-butyl acrylate, methacrylic acid, beta-CEA (β-carboxyethyl acrylate), and an optional surfactant.

8. The aqueous ink of claim 1, wherein the polymer latex comprises polymer particles having a volume average particle size of from about 20 to less than about 200 nanometers.

9. The aqueous ink of claim 1, wherein the low molecular weight humectant solute has a molecular weight of from about 100 to about 3,000 g/mole.

10. The aqueous ink of claim 1, wherein the low molecular weight humectant solute is selected from the group consisting of betaine, betaine derivatives, polyols, sugars, and mixtures and combinations thereof.

11. The aqueous ink of claim 1, wherein the low molecular weight humectant solute is a polyol solute having a melting point of from about 55 to about 200° C.

12. The aqueous ink of claim 1, wherein the low molecular weight humectant solute is selected from the group consisting of sorbitol, maltitol, mannitol, xylitol, isosorbide, and mixtures and combinations thereof.

13. The aqueous ink of claim 1, wherein the low molecular weight humectant solute is selected from the group consisting of a compound of the formula

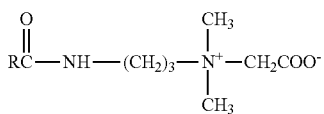

wherein R represents an alkyl group derived from coconut oil or a 8 to 10 carbon alkyl chain derived from palm kernel oil; and a compound of the formula

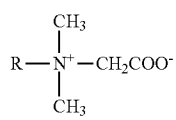

wherein R represents an alkyl group is derived from coconut oil.

14. The aqueous ink of claim 1, wherein the low molecular weight humectant solute is selected from the group consisting of

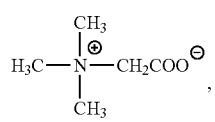

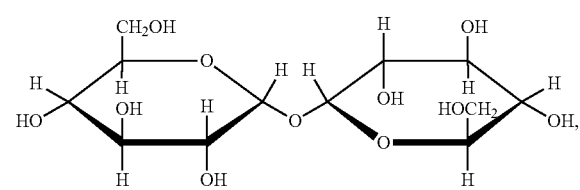

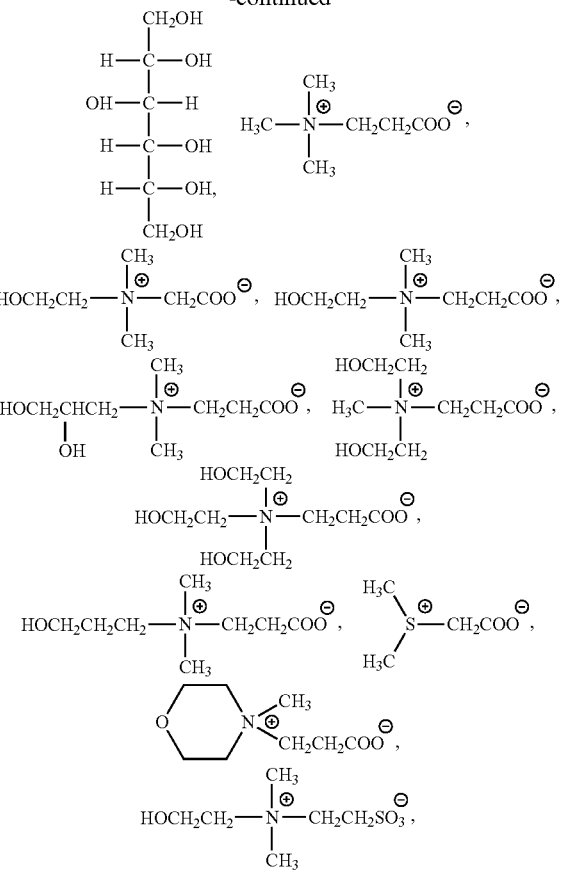

and mixtures and combinations thereof.

15. The aqueous ink of claim 1, wherein the ink has a surface tension of from about 15 to about 50 mN/m.

16. The aqueous ink of claim 1, wherein the ink has a viscosity of from about 2 to about 20 centipoise at a jetting temperature of from about 30° C. to about 40° C.

17. A process for preparing an aqueous ink composition comprising:
1) preparing a polymer latex;
2) combining the polymer latex with an encapsulated resin pigment, water, a co-solvent, and a low molecular weight humectant solute; wherein the total solids content of the aqueous ink is from about 2 to about 25 percent by weight based on the total weight of the aqueous ink composition to form an aqueous ink composition; and
3) optionally, filtering the aqueous ink composition.

18. The process of claim 17, wherein the total solids content of the aqueous ink is from about 7 to about 15 percent by weight based on the total weight of the aqueous ink composition.

19. The process of claim 17, wherein the co-solvent has a solubility parameter in the range of from about 27 to about 37 MPa$^{1/2}$.

20. A process comprising:
incorporating an aqueous ink comprising water; a co-solvent; an encapsulated resinous pigment; a polymer latex; and a low molecular weight humectant solute; wherein the total solids content of the aqueous ink is from about 2 to about 25 percent by weight based on the total weight of the aqueous ink composition into an ink jet printing apparatus;

ejecting droplets of ink in an imagewise pattern onto an intermediate transfer member; optionally, heating the image to partially or completely remove solvents; and transferring the ink in the imagewise pattern from the intermediate transfer member to a final recording substrate; or ejecting droplets of ink in an imagewise pattern directly onto a final image receiving substrate.

\* \* \* \* \*